U. A. TOWLE.
STEERING GEAR CONNECTION FOR MOTOR VEHICLES.
APPLICATION FILED JULY 14, 1913.
1,084,567.
Patented Jan. 13, 1914.
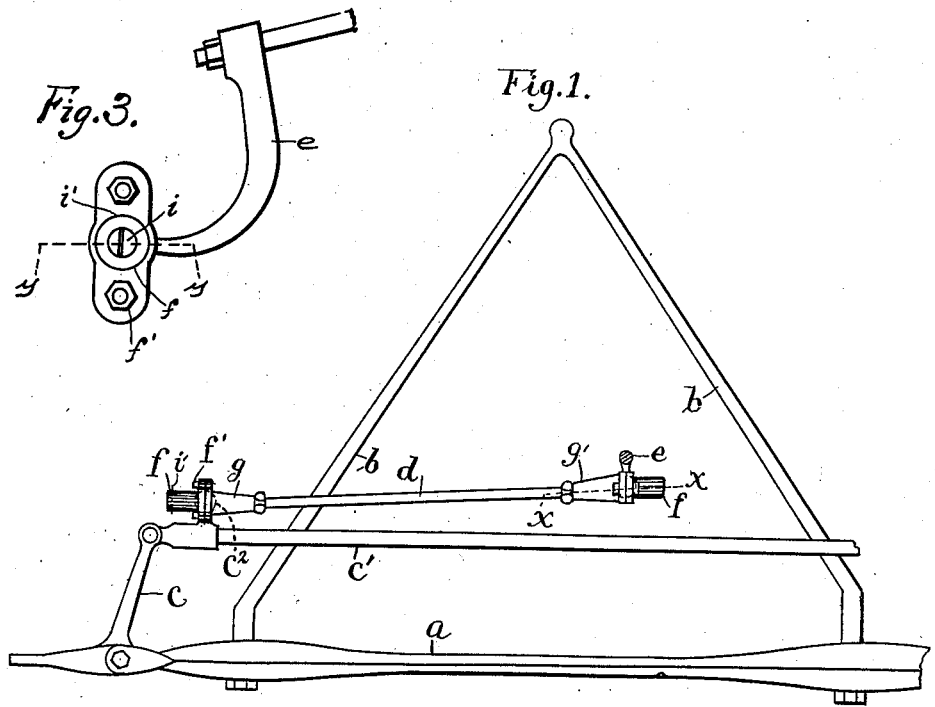
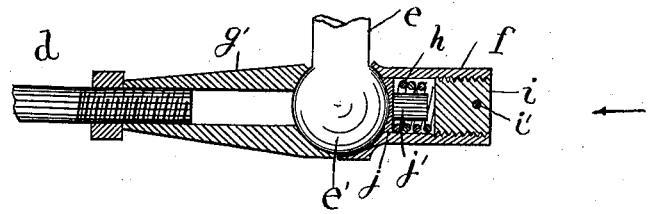
Witnesses:
B. M. Hunter
C. B. Creighton
Inventor:
Urban A. Towle
by S. W. Bates
Atty.

UNITED STATES PATENT OFFICE.

URBAN A. TOWLE, OF PORTLAND, MAINE.

STEERING-GEAR CONNECTION FOR MOTOR-VEHICLES.

1,084,567. Specification of Letters Patent. Patented Jan. 13, 1914.

Application filed July 14, 1913. Serial No. 778,866.

*To all whom it may concern:*

Be it known that I, URBAN A. TOWLE, a citizen of the United States, of Portland, in the county of Cumberland and State of Maine, have invented certain new and useful Improvements in Steering-Gear Connections for Motor-Vehicles, of which the following is a specification.

My invention relates to the construction of the steering gear of that class of motor vehicles known as the "Ford" type. In these motor vehicles the steering knuckles are connected by means of a steering spindle connecting rod carrying a ball, a ball being also carried by the lower end of the steering post arm. These two balls are united by a steering gear connecting rod by which the motion of the steering post is transmitted to the steering spindle connecting rod and is thence transmitted to the steering knuckles. This steering gear connecting rod has on each end a fixed half socket in which is seated one of said balls and as these connections have hitherto been made, the other half of the socket was formed by a similar half socket bolted to the fixed half socket to form the usual ball and socket joint connection. In practice it is found that the wear of these ball and socket joints causes them to rattle and requires frequent adjustment.

The object of my invention is to provide a simple device to take up the wear between the sockets and balls in a steering gear of the type shown and to allow of easy steering under all conditions. This I accomplish by connecting the steering post arm to the connecting rod ball by means of a rod and two spring sockets so placed as to oppose each other.

Another object, and the most important, is the providing of a rigid drive from the steering post arm to the wheels in a direction tending to turn the car toward the left. It is well known that automobiles have a tendency to run off the road to the right and consequently a constant pressure must be exerted to bring them back on the road. This could not be accomplished by placing springs upon both sides of the ball connections as it would result in a constant wabble of the front wheels and a consequent rapid wear on the tires. By my arrangement I have provided a means whereby the car can be easily and positively steered and at the same time I have provided against wear which results in rattling and also against the wear upon the tires.

By this simple substitution of a spring socket for a rigid socket I prevent the rattling of the joint and at the same time provide yielding connection with the steering post.

My invention may best be understood by means of the accompanying drawing, in which—

Figure 1 is a plan view of a portion of the steering mechanism of a Ford car with my device applied thereto. Fig. 2 is a detail view of my invention partly in elevation and partly in section taken on the line Y—Y of Fig. 3. Fig. 3 shows the construction between the steering post and socket, looking in the direction of the arrow in Fig. 2.

Referring to the drawings, $a$ represents the axle, $b\ b$ is the radius rod, $c$ is one of the steering knuckles, $c'$ is the connecting rod which connects the steering knuckles, only one of which is shown, $c^2$ is a ball carried by the connecting rod $c'$, $e$ is the lower end of the steering post arm terminating in a ball $e'$, $d$ is the steering gear connecting rod having on its ends the fixed half sockets $g$ and $g'$ each of these half sockets partially inclosing one of the balls $c^2$ and $e'$.

I complete the ball and socket joint at each end of the connecting rod $d$ by bolting to the half socket $g$ and to the half socket $g'$ a special removable half socket $f$ which contains a plunger $j$ formed and located to bear against the surface of the ball, the plunger being forced inward by a helical spring $h$. The plunger $j$ has a shank $j'$ which fits inside the spring and an adjusting screw plug $i$ is screwed into the outer end of the half socket to regulate the tension of the spring and compensate for the wear of the plunger.

The half socket $f$ is secured to the half sockets $g$ and $g'$ by the same bolts $f'$ which secured the old half socket referred to, so that all that is required to apply my invention to a Ford machine is to take off the old rigid sockets and put my spring sockets on with the same screws. A cotter pin $i'$ extends through the plug $i$ to prevent it from turning. In fitting the half socket $f$ a little play is left between the socket proper and the ball so that the entire bearing on that side will be taken by the spring pressed plunger.

By the application of my spring half sockets the joints are not only kept constantly tight but the steering gear is provided with a spring or yielding connection which renders steering much easier than with a rigid connection, particularly on rough roads.

I claim:—

In a motor vehicle of the character described, the combination of a steering post arm having a ball on its end, a pair of steering knuckles, a connecting rod connecting said knuckles, a ball carried by said connecting rod, a steering gear connecting rod having at each end a fixed half socket, a removable half socket secured to each of said fixed half sockets, each fixed half socket and its corresponding removable half socket forming a complete socket embracing one of said balls and a spring pressed plunger within each of said removable half sockets for yieldingly holding the ball in contact with the fixed half socket.

In testimony whereof I have affixed my signature, in presence of two witnesses.

URBAN A. TOWLE.

Witnesses:
S. W. BATES,
C. B. CREIGHTON.